(No Model.) 3 Sheets—Sheet 1.

S. A. DONNELLY.
BICYCLE.

No. 447,234. Patented Feb. 24, 1891.

WITNESSES
A. J. Schwartz
J. F. Reily

Samuel A. Donnelly
INVENTOR
By W. J. FitzGerald
Attorney

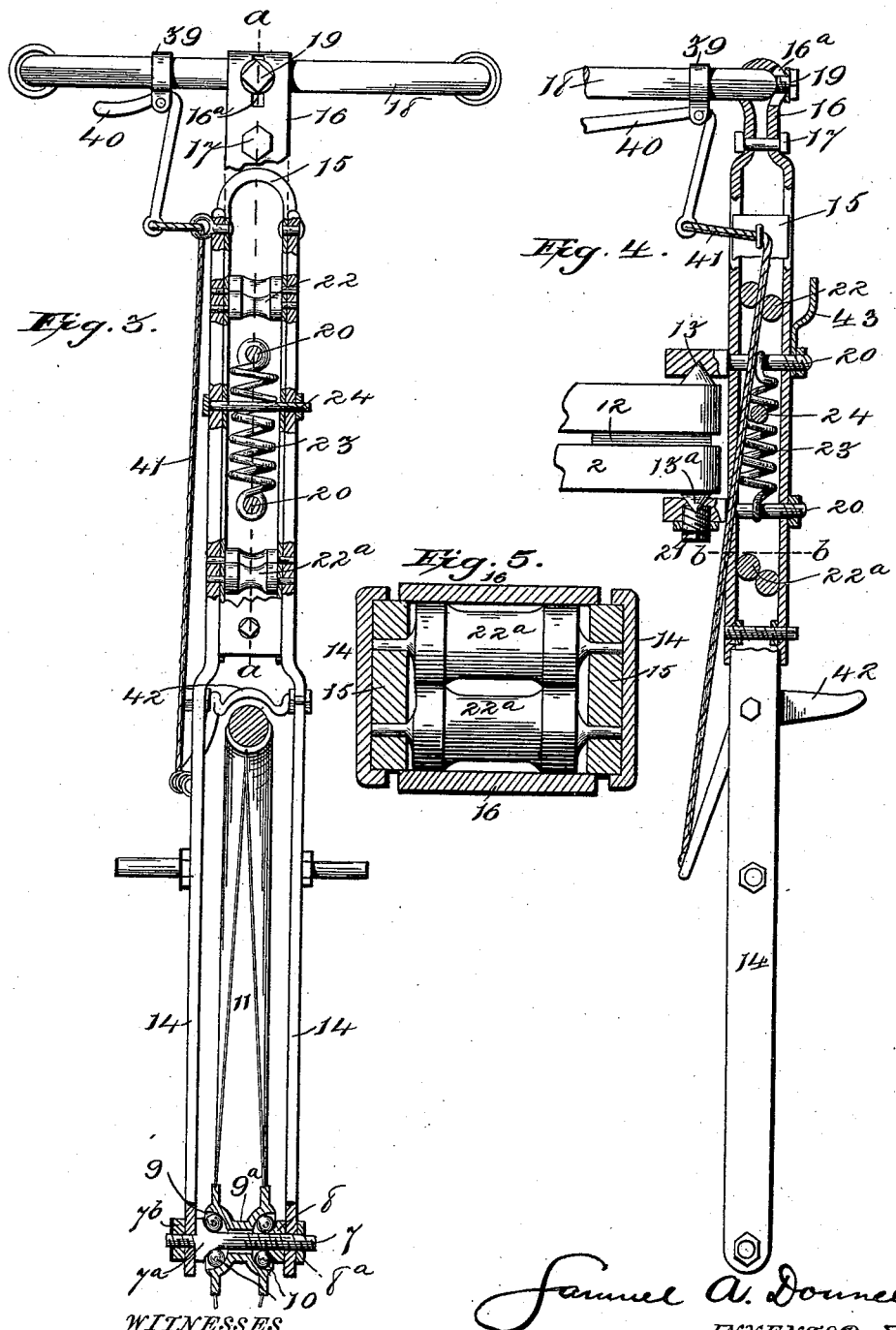

(No Model.) 3 Sheets—Sheet 3.

S. A. DONNELLY.
BICYCLE.

No. 447,234. Patented Feb. 24, 1891.

WITNESSES
A. J. Schwartz
J. F. Reily

Samuel A. Donnelly
INVENTOR
By W. Fitzgerald
Attorney

UNITED STATES PATENT OFFICE.

SAMUEL A. DONNELLY, OF CHICAGO, ILLINOIS.

BICYCLE.

SPECIFICATION forming part of Letters Patent No. 447,234, dated February 24, 1891.

Application filed February 24, 1890. Serial No. 341,606. (No model.)

*To all whom it may concern:*

Be it known that I, SAMUEL A. DONNELLY, a citizen of the United States, residing at 668 Throop street, Chicago, county of Cook, State of Illinois, have invented a new and useful Bicycle, of which the following is a specification.

My invention consists in a new and improved bicycle in which are comprised many novel and valuable features combining to produce a bicycle which is very light and strong in its construction, and which will give the highest degree of ease and comfort in use; and my invention will be hereinafter fully described and claimed.

Figure 1:
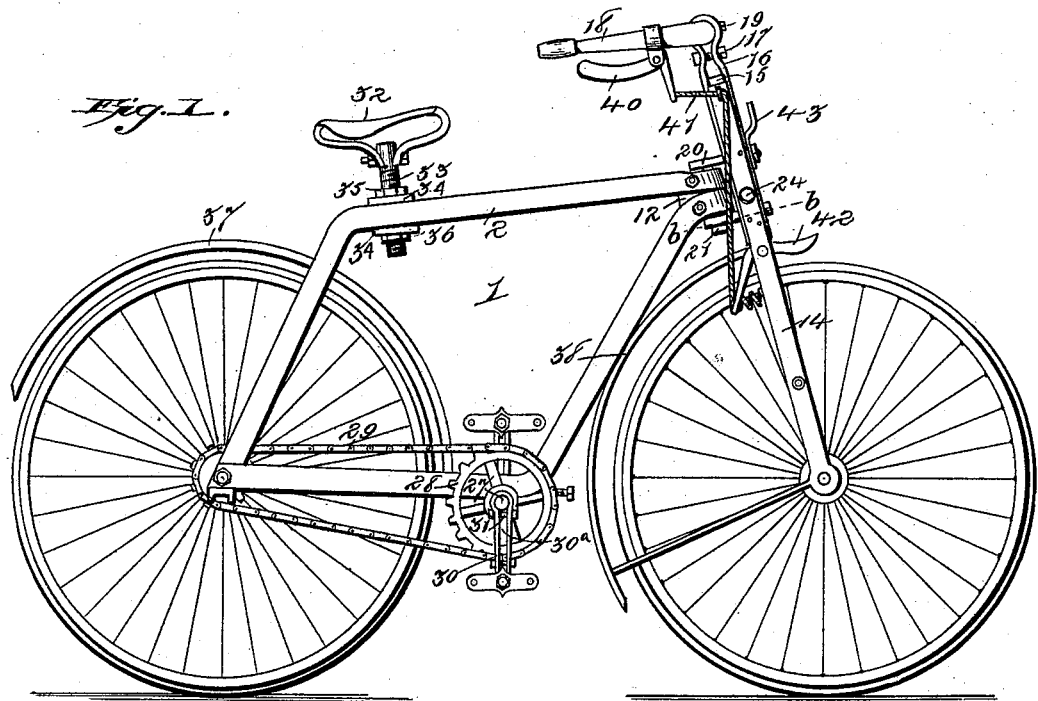
Figure 2:
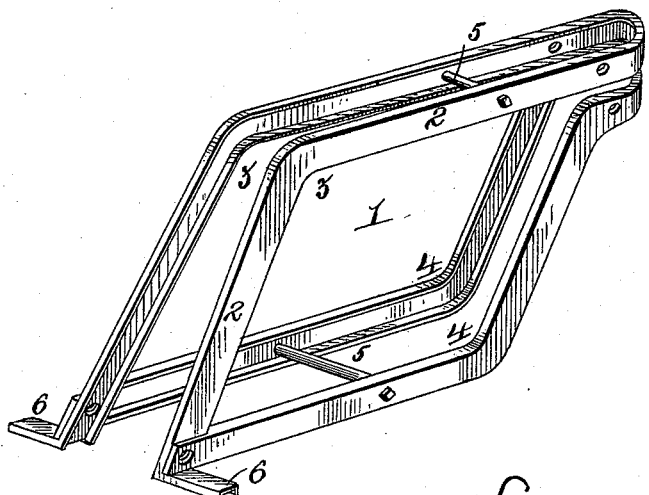
Figure 6:
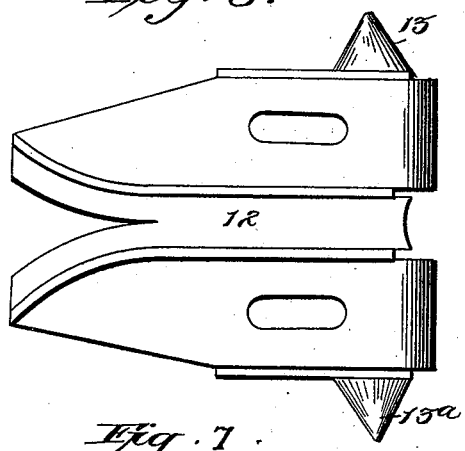
Figure 7:
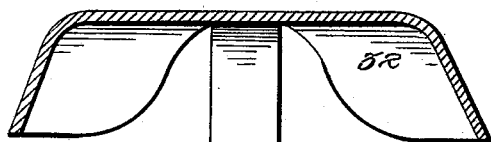
Figure 8:
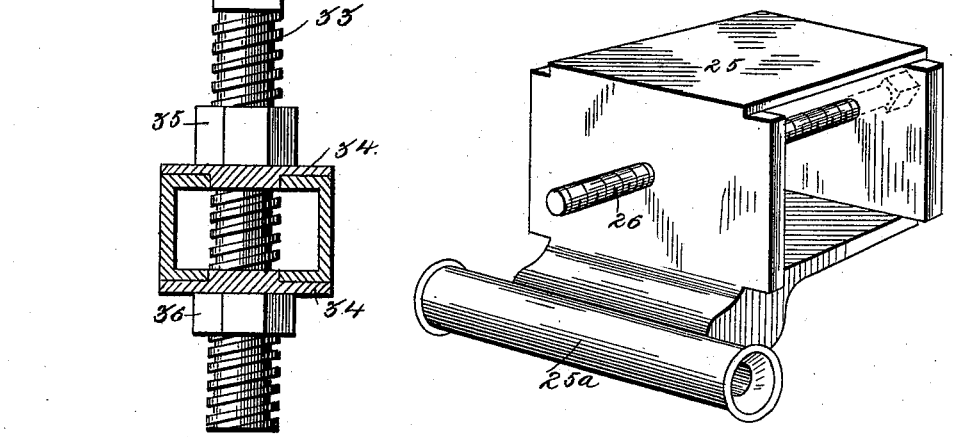

Referring to the accompanying drawings, Figure 1 is a side view of my new and improved bicycle. Fig. 2 is a perspective view of the diamond frame of my machine. Fig. 3 is a front view partly in section. Fig. 4 is a sectional view taken on line $a\ a$ of Fig. 3. Fig. 5 is a cross-sectional view taken on line $b\ b$ of Fig. 1. Fig. 6 illustrates in detail the frame-head. Figs. 7 and 8 are detail views, hereinafter described.

The same numerals of reference indicate corresponding parts in all the figures.

Referring to the several parts by their designating numerals, 1 indicates the diamond frame of my new and improved bicycle. This frame, as well as other parts of my bicycle, which will be hereinafter described, is formed of the "channel-bar" 2, the longitudinal edges of which are bent at right angles to the body of the bar and parallel to each other, as clearly shown in the drawings. This construction gives great strength and rigidity with light weight of metal, as will be readily seen, thereby decreasing the weight of the entire bicycle while adding to its strength, rigidity, and durability.

I form the entire diamond frame of my bicycle of two pieces or lengths of the channel-bar, one piece extending up from the rear lower corner of the frame to the point 3, where it is bent forward horizontally, and at the upper forward end of the frame is curved around and extended back nearly parallel to the lower rear corner of the frame. The other piece of the diamond frame extends from the lower rear corner forward to the point 4, and is then bent up, curved around at the upper forward end of the frame, and extends back nearly parallel to the rear end of the frame, as shown, and the bracing-bolts 5 are secured through the frame, as shown. The lower ends of the upper piece of the frame are bent out at right angles to form mounting-steps 6 6 on each side of the machine.

In the lower rear end of the diamond frame is secured the rear wheel $9^a$, which is mounted like the front wheel 11, its axle 7 being formed at one end with the cone-bearing $7^a$, having a clamping-nut $7^b$ on that threaded outer end, while upon the other threaded end of the axle is screwed a cone-nut 8 and an outer nut $8^a$. The hub of the wheel $9^a$ is formed with the curved conical seats 9, and anti-friction bearing-balls 10 are arranged, as shown, between the hub of the wheel and the seats formed by the conical end of the axle and the cone-nut 9. The front wheel 11 is constructed and mounted in the lower end of the front fork in precisely the same manner as the rear wheel, and this construction is illustrated in Fig. 3 of the drawings, the corresponding parts of the two wheels bearing the same reference-letters, thereby avoiding burdening the drawings with a sectional view of the rear wheel.

In the rounded upper end of the diamond frame is bolted the frame-head 12, which is shown in detail in Fig. 6. This consists of a solid steel block formed as shown, to adapt it to fit in the rounded upper forward end of the frame, between the channel-bars of which the frame is composed, and having the upper and lower pivot-points 13 $13^a$ formed integral with it.

The front fork of my bicycle is formed of two straight pieces 14 14 of my channel-bar, which are secured with their flanges facing each other, and between the upper half of these pieces is riveted or bolted a frame-piece 15, formed of a flat metal strip bent into a long U shape, the rounded end of this U-frame being placed at the top. This U-frame fits down into the channel-bars 14 between their flanges, as clearly shown in Fig. 5, and the two are secured together, as shown.

The head-frame 16 of the front fork is formed of a flat strip of metal bent around upon itself so that its two sides are parallel, transverse bolts 17 passing through the frame near its upper and lower ends. In the rounded upper end of this frame is secured the curved handle-bar 18, which is held by a set-screw 19, passing through a vertical slot 16ª in the upper end of the head-frame, this slot admitting of the adjustment up or down of the handles by turning the handle-bar to the point desired. The sides of the head-frame extend down in the front and rear sides of the U-frame 15, fitting in between, but not touching, the edge flanges of the channel-bars 14 14, as most clearly shown in Fig. 5. Through the central part of the head-frame are secured the eyebolts 20 20, which form bearings for the pivot-points 13 13ª of the frame-head 12, the lower eyebolt having a set-screw 21 screwed into it, the upper end of which is cupped to form an adjustable bearing for the point of the lower pivot 13ª. Within the hollow front fork are mounted the upper and lower pairs of rollers 22 22ª, which are arranged, as shown, so that their outer edges bear against the side pieces of the head-frame 16. Within the hollow fork is arranged a spiral spring 23, the ends of which are secured to the stems of the eyebolts 20, while a bolt 24 is secured transversely through the hollow fork and passes through the center of this spiral spring.

It will now be seen that in operation when the front wheel of my bicycle strikes against a stone or other considerable obstruction the wheel will rise, the hollow fork sliding up in the head-frame 16, while the spiral spring 23, which is secured to the head-frame and through the center of which the transverse bolt 24 of the hollow fork passes, will operate to prevent all jarring of the rider, the parts moving easily with a spring action. At the same time the rollers 22 22ª, running on the inside of the head-frame, prevent, or, rather, reduce to a minimum, all friction between the sliding fork and the sides of the head-frame, which would otherwise be considerable, owing to the inclination of the front fork, as will be readily seen.

Between the lower part of the diamond frame of the bicycle is mounted an adjustable bearing-block 25, which may be adjusted between the flanged channel-bars of the diamond frame by a set-screw 26, the end of which bears against the fixed lower end of the mud-guard 37, and at the lower end of this box is formed the transverse crank-shaft box 25ª, in which the crank-shaft 27 is mounted. This crank-shaft has the sprocket-wheel 28 secured upon it, a driving-chain 29 passing around the wheel and the sprocket-wheel on the rear-wheel axle.

Upon the upper part of the diamond frame is secured the saddle 32, the threaded post 33 of which passes through plates 34, placed on the upper and lower sides of the flanged diamond frame, as clearly shown in Fig. 8 of the drawings, and nuts 35 36 are screwed on the threaded post above and below these bearing-plates. The saddle is thus firmly supported, and its height can be readily adjusted by turning the nuts 35 36.

Above the rear and front wheels of the bicycle are secured the curved mud-guards 37 38, formed each of a curved section or piece of my channel-bar, which answers the purpose admirably. To the handle-bar is pivoted in a collar 39 a brake-handle 40, which is connected by a flexible wire-cord 41 with a spoon-brake 42, pivoted in the front fork immediately over the front wheel, as shown. To the front of the fork is secured a lamp-bracket 43.

From the foregoing description, taken in connection with the accompanying drawings, the construction and advantages of my invention will be readily understood.

It will be seen that my new and improved bicycle is exceedingly light and strong, while the sliding spring-actuated front fork, in the lower end of which the front wheel is mounted, entirely prevents jolting and jarring of the rider and breakage of the machine in case of striking obstructions.

Having thus described my invention, what I claim, and desire to secure by Letters Patent, is—

1. In a bicycle, the diamond-shaped frame formed of two metal strips bent to form a diamond frame, each strip extending from the rear to the front end of the frame, where it is curved around and extends back to the rear frame end, substantially as set forth.

2. The double frame formed of the two channel-bars 2, bent to form a diamond-shaped frame and connected by the transverse bracing-bolts, each channel-bar extending from the rear to the front end of the frame, where it is curved around and extends back to the rear frame end, substantially as set forth.

3. In a bicycle, the combination, with a front fork having the bearings 20 20, of the diamond frame formed of the channel-bars 2, bent to form the double diamond frame secured by transverse bracing-bolts, and the frame-head 12, adapted to fit in the rounded front end of the diamond frame and formed with the upper and lower pivot-points 13 13ª, substantially as set forth.

4. In a bicycle, the double diamond frame formed of the channel-bars 2, the lower ends of the upper bar being bent at right angles to form the integral mounting-steps 6 6, substantially as set forth.

5. In a bicycle, the combination, with the frame having at its forward end the frame-head 12, formed with the upper and lower pivots 13 13ª, of the front fork formed of the channel-bars 14 and the U-shaped frame 15, secured between them, the head-frame 16, having the eyebolts 20 secured transversely in it, the spiral spring 23, secured at its ends to said bolts, and the transverse bolt 24, secured in the hollow fork, substantially as set forth.

6. In a bicycle, the combination, with the frame having at its forward end the frame-head 12, formed with the upper and lower pivots 13 13ª, of the front fork formed of the channel-bars 14 and the U frame 15, secured between them, the upper and lower pairs of rollers 22 22ª, journaled in the hollow fork, the head-frame 16, having the eyebolts 20 secured transversely in it, the spiral spring 23, secured at its ends to said bolts, and the transverse bolt 24, secured in the hollow fork, substantially as set forth.

7. The combination, with the bicycle-frame, of the saddle having the threaded post 33, the lower and upper plates 34, and the adjusting and retaining nuts 35 36, screwing on the threaded saddle-post above and below the plates 34, substantially as set forth.

8. The combination, with the frame 1, formed of the parallel flanged channel-bars, of the square bearing-box 25, movably fitted between the lower part of said frame and formed at its lower end with the integral crank-shaft box 25ª, and the adjusting-screw 26, substantially as set forth.

SAMUEL A. DONNELLY.

Witnesses:
WM. J. MINTLINE,
MARGARET DONNELLY,
JOSEPH DONNELLY.